United States Patent
Brinkmann et al.

(10) Patent No.: US 9,328,675 B2
(45) Date of Patent: May 3, 2016

(54) METHOD FOR INFLUENCING THE THERMAL BALANCE OF AN INTERNAL COMBUSTION ENGINE

(71) Applicant: Ford Global Technologies, LLC, Dearborn, MI (US)

(72) Inventors: Bernd Brinkmann, Dormagen (DE); Ben Thomas, Enfield (GB); Michael Rowland, Wickham Bishops (GB); Gareth Price, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 643 days.

(21) Appl. No.: 13/754,706

(22) Filed: Jan. 30, 2013

(65) Prior Publication Data

US 2013/0204510 A1    Aug. 8, 2013

(30) Foreign Application Priority Data

Feb. 2, 2012 (DE) .......................... 10 2012 201 541

(51) Int. Cl.
*F02D 41/00* (2006.01)
*F02D 41/04* (2006.01)
*F02D 41/30* (2006.01)

(52) U.S. Cl.
CPC ............... *F02D 41/00* (2013.01); *F02D 41/04* (2013.01); *F02D 41/3094* (2013.01); *F02D 41/0007* (2013.01); *F02D 2200/021* (2013.01); *F02D 2200/0414* (2013.01)

(58) Field of Classification Search
CPC ............... F02D 2200/0414; F02D 2200/0614; F02D 2200/021; F02D 2200/022; F02D 2041/001; F02D 41/1401; F02D 41/1454; F02D 41/00; F02D 41/0002; F02D 41/30

USPC .................................................. 701/103, 104
See application file for complete search history.

(56) References Cited

U.S. PATENT DOCUMENTS

| | | | | |
|---|---|---|---|---|
| 4,389,994 A * | 6/1983 | Denz | ....................... | F02D 23/02 123/406.55 |
| 4,485,625 A * | 12/1984 | Fujimoto | ............ | F02D 41/0007 123/494 |
| 5,769,055 A * | 6/1998 | Motose | .................... | F01P 11/16 123/198 D |
| 2005/0229908 A1* | 10/2005 | Kuzuyama | ............ | F02D 35/025 123/552 |
| 2006/0196472 A1 | 9/2006 | Niimi | | |
| 2009/0271091 A1* | 10/2009 | Morita | .................. | F02D 41/064 701/103 |
| 2011/0231081 A1* | 9/2011 | Suzuki | .................. | F01N 11/005 701/104 |
| 2011/0295488 A1* | 12/2011 | Ramappan | .......... | F02D 41/2467 701/103 |
| 2012/0290193 A1* | 11/2012 | Suzuki | ................ | F02D 13/0261 701/103 |

FOREIGN PATENT DOCUMENTS

| DE | 3439840 A1 | 5/1985 |
|---|---|---|
| DE | 102010017790 A1 | 1/2012 |
| DE | 102010017791 A1 | 1/2012 |

(Continued)

*Primary Examiner* — Hai Huynh
*Assistant Examiner* — Raza Najmuddin
(74) *Attorney, Agent, or Firm* — Julia Voutyras; Alleman Hall McCoy Russell & Tuttle LLP (57) ABSTRACT

A method for reducing the thermal load of an internal combustion engine without substantially reducing its power output is described. The method includes adjusting an engine air-fuel ratio responsive to one or more of a charge air over-temperature, a coolant over-temperature and an engine efficiency parameter.

19 Claims, 4 Drawing Sheets

(56) References Cited

FOREIGN PATENT DOCUMENTS

| | | | |
|---|---|---|---|
| EP | 2546490 | A1 | 3/2010 |
| JP | H0481544 | A | 3/1992 |
| JP | 2002332890 | A | 11/2002 |
| JP | 2006070859 | A | 3/2006 |

* cited by examiner

METHOD FOR INFLUENCING THE THERMAL BALANCE OF AN INTERNAL COMBUSTION ENGINE

CROSS REFERENCE TO RELATED APPLICATIONS

The present application claims priority to German Patent Application No. 102012201541.8, filed on Feb. 2, 2012, the entire contents of which are hereby incorporated by reference.

FIELD

This disclosure relates to a method for reducing the thermal load of an internal combustion engine without substantially reducing its power output.

BACKGROUND AND SUMMARY

Internal combustion engines have at least one cylinder head connected to a cylinder block in such a manner that the pair can form at least one combustion chamber, or cylinder. Within the cylinder, combustion gasses are discharged via exhaust openings while the chamber is filled with air via inlet openings that allow charge air from an intake manifold to be drawn into the chamber. With respect to a charge change, the cylinder head is therefore subjected to a high thermal and mechanical load as it reciprocates within the chamber to transform combustion energy into rotational motion of the crankshaft. In addition, due to an increasing integration of components within the engine bay the packing of components is becoming increasingly dense so the demands on the cylinder head are also increasing.

In this context, an increasing proportion of engines are charged by means of exhaust turbochargers and/or mechanical chargers in order to power all of the components within the engine. As such, the thermal load on the engine or cylinder head rises further so higher demands are made on the cooling system. In response, measures are taken to influence the thermal balance of the internal combustion engine to prevent a thermal overload of the engine.

When an engine includes an air cooling system, the engine may include a fan to dissipate heat by means of an air flow guided over the surface of the engine. However, because fluids have a higher thermal capacity compared to air, liquid cooling systems allow substantially greater heat quantities to be dissipated than is possible with air cooling. For this reason combustion engines under high thermal load are usually equipped with liquid cooling.

With regard to the design of engine cooling systems, maximum cooling demand is commonly found in order to ensure adequate cooling of the engine under all operating conditions. However, the result of this is an engine cooling system that is over-dimensioned in relation to normal operation, that is, in relation to the average cooling demand. Therefore, the cooling power of the engine is designed for operating states characterized by high loads with simultaneously low vehicle speeds, for example operating conditions that correspond to acceleration and hill climbing, to prevent overheating of the engine while supplying the required cooling power under the least favorable conditions. Under such conditions the engine cooling system dissipates a very large quantity of heat without the availability of air flow. In addition, under certain circumstances, high ambient temperatures can further aggravate the problem of providing adequate cooling power.

When the engine cooling system is designed in a manner that accommodates the scenario described above, large coolers or heat exchangers result that are difficult to accommodate in the front-end region of a vehicle. But, due to a limited amount of space available, this presents difficulties since enlarging the radiator is not an option as further heat exchangers, in particular cooling devices, are also included to ensure secure fault-free operation of the engine or to optimize the operation of the engine. Therefore, an inclusion of overly-large radiator may severely restrict the arrangement and dimensions of other heat exchangers within the engine compartment.

In one example, engines are known that are fitted with a multiplicity of heat exchangers designed with sufficiently large heat-transmitting area to fulfill their function. However, because of the limited space available in an engine system, conflicts arise between the size and arrangement of individual heat exchangers in the front-end region. Therefore, in some embodiments, radiators are arranged in line, spaced apart and overlap partly. In addition, flow guide plates may be included to direct or guide the flow of air through the engine compartment.

In another example, cooling systems are known that have powerful fan motors to drive, or set in rotation, a fan wheel in order to provide a sufficiently high mass air flow to heat exchangers within the cooling system. The fan motors are usually driven electrically and can support the heat transmission in the heat exchangers at any operating point, even when the motor vehicle is stationary or stopped, or when the vehicle operates at low vehicle speeds.

In yet another example, radiators with two fans are known wherein a higher cooling power results from two fans that can cover a larger area than a single fan or single fan wheel. In this context, a radiator for liquid cooling has particular significance as this radiator ensures safe operation of the internal combustion engine by dissipating large quantities of heat. Nonetheless, further measures are required to limit the thermal load of internal combustion engines even under the least favorable circumstances.

To prevent thermal overloads of an engine, methods to control the charge pressure on the intake side of the engine as a function of the coolant temperature $T_{Coolant}$, the charge air temperature $T_{Charge}$ and/or the rotation speed of the engine are known. In particular the charge pressure is lowered if the coolant temperature, $T_{Coolant}$, the charge air temperature, $T_{Charge}$ and/or the rotation speed of the internal combustion engine reaches, exceeds, or falls below a predefined value. However, this derating method has disadvantages since the reduction of charge pressure also leads to a reduced engine power. Therefore, the heat input into the engine is lowered by reducing the engine power. In certain circumstances, though, a reduction in engine power is not acceptable. For example, a driver of a motor vehicle must have the power demanded on acceleration or on hill climbing, not just for comfort reasons but in some cases also from safety aspects.

The inventors herein have recognized the above issues, as well as limitations of such approaches. In this context, the methods described include of influencing the thermal balance of an engine in a manner that reduces the thermal load of an engine without substantially reducing the output power provided by the engine.

One example method includes determining at least one of a charge air temperature $T_{Charge}$, a coolant temperature $T_{Coolant}$ and/or the ratio value $\eta_{ignition,act}/\eta_{ignition,opt}$, wherein $\eta_{ignition,act}$ is an efficiency of the engine system at a momentary ignition timing point and $\eta_{ignition,opt}$ is an efficiency of the engine system at the optimized ignition timing point. Then, in response to one or more of these values, a control system may reduce an air ratio (e.g., air-fuel ratio) λ as a function of an input variable. For example, if $T_{Charge}$ is greater than the upper limit temperature, $T_{Charge,up}$, the air ratio λ may be reduced as a function of $T_{Charge}$.

Therefore, according to the example method, the air ratio λ is reduced as a function of an input parameter within the system wherein the fuel-air mixture is enriched to reduce the thermal load of the engine without substantially reducing the power to the engine. In particular, the method allows the reduction of the heat input even in demanding driving situations, while at the same time maintaining the driving speed or charge pressure and hence the power.

Within the context of the present disclosure, the engine system described encompasses diesel engines, spark-ignition engines and also hybrid internal combustion engines. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
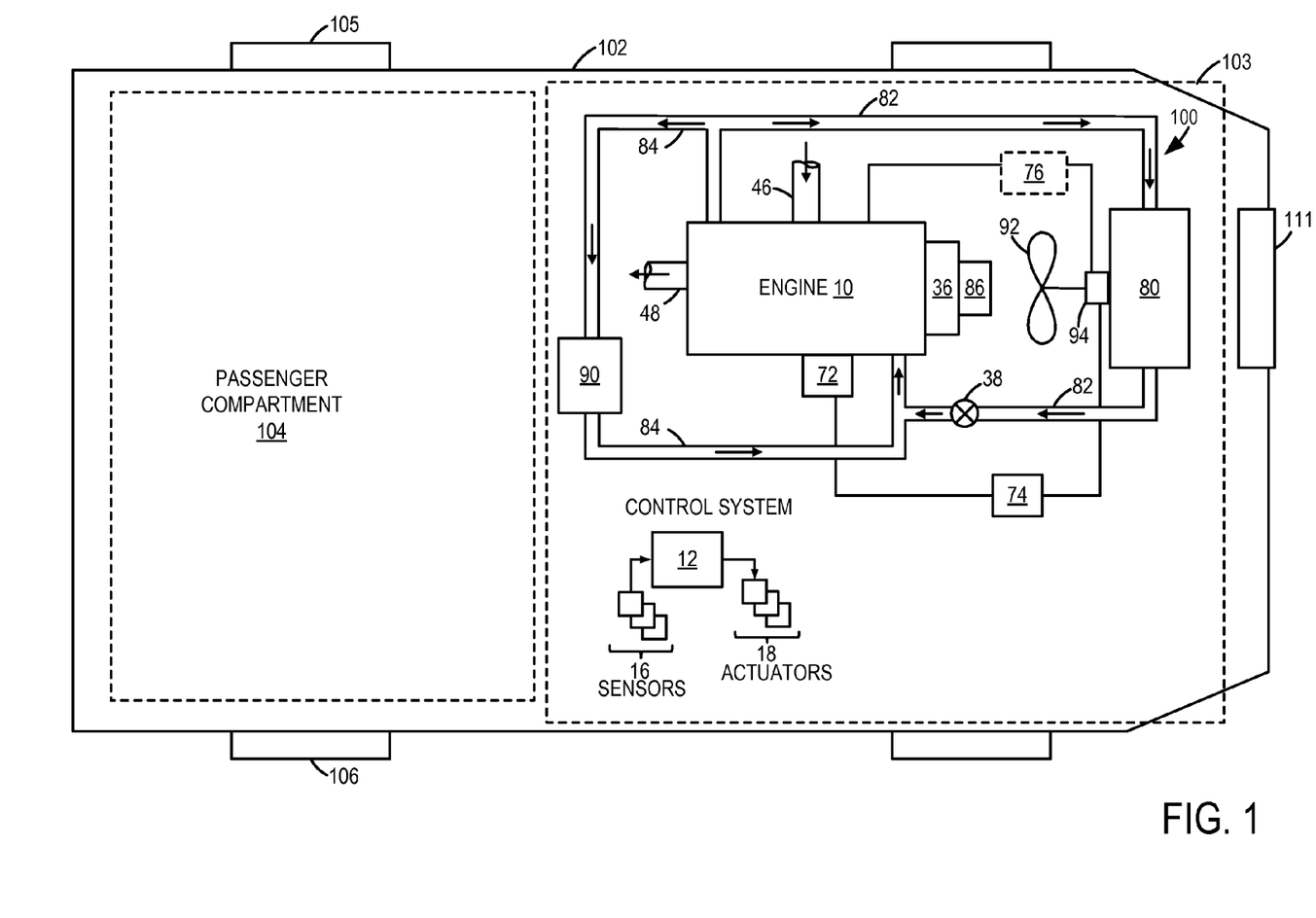
FIG. 1 schematically shows an example embodiment of a vehicle cooling system in a motor vehicle.
Figure 2:
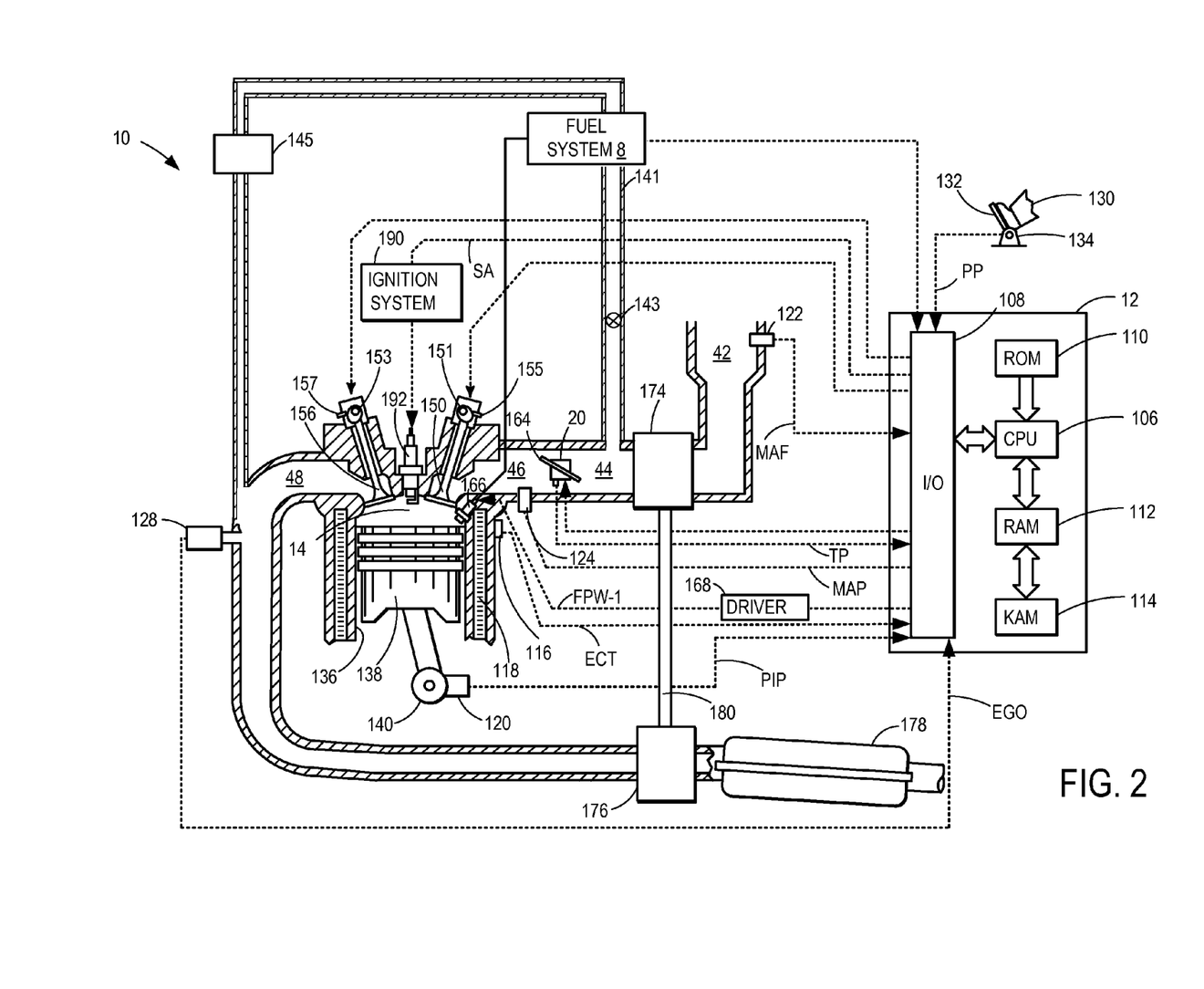
FIG. 2 shows an example embodiment of an engine combustion chamber.
Figure 3:
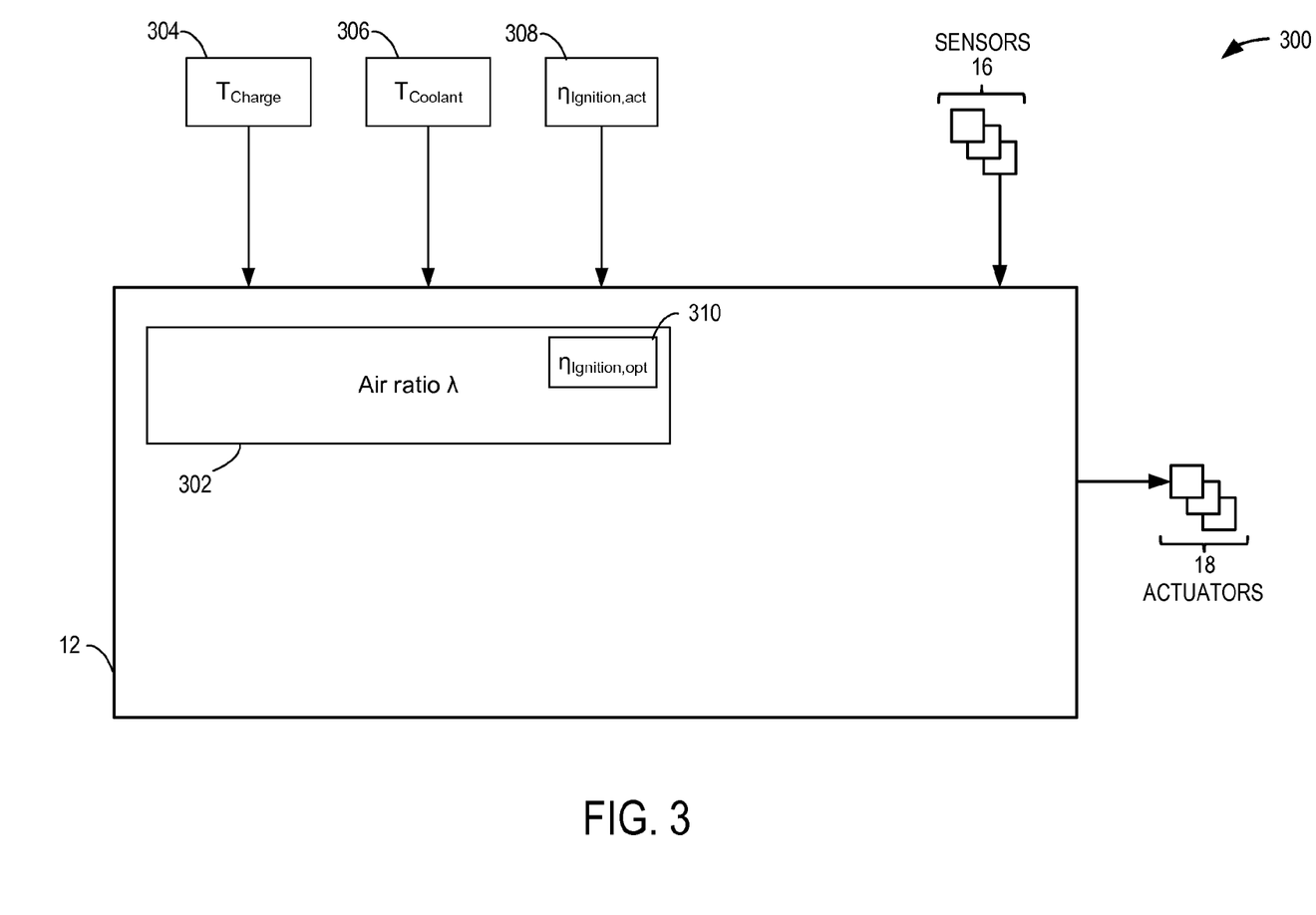
FIG. 3 is a schematic diagram of an example engine control unit comprised of a map that stores air ratio values as a function of input variables according to the method.
Figure 4:
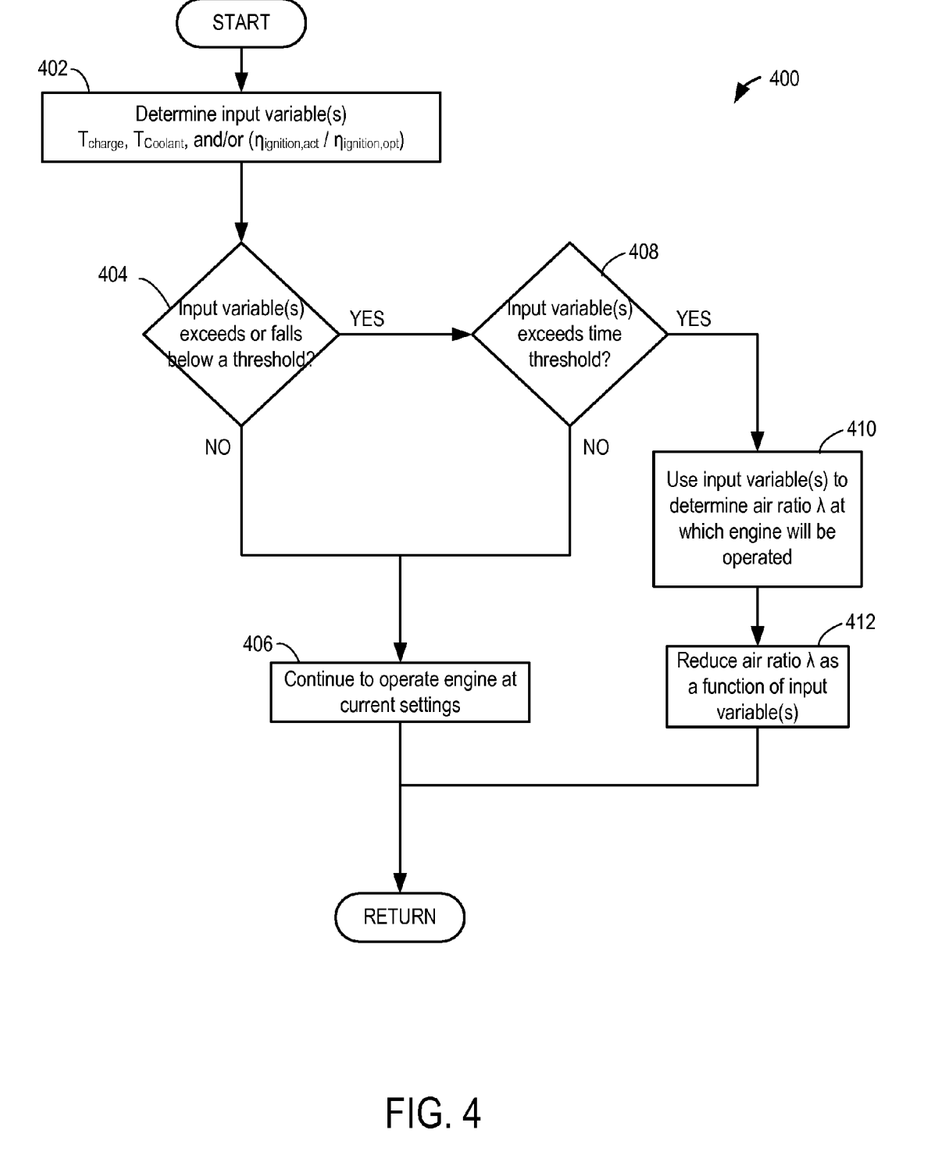
FIG. 4 is a flow chart of an example method for influencing the thermal balance of an engine without reducing its power output.

Methods and systems are provided for reducing the thermal load of an engine without substantially reducing its power. To reduce the thermal load, an air flow ratio in the engine system is reduced when an input variable exceeds or falls below a predefined threshold. Because the method involves both charge air and liquid-coolant temperature variable, FIGS. 1 and 2 show example embodiments comprised of a liquid cooling system coupled to the engine system. Then, FIG. 3 shows an example engine control unit capable of receiving feedback from the engine system that it used to further adjust settings in order to reduce the thermal load. FIG. 4 is a flow chart of an example method for reducing the thermal balance of an engine in response to at least one input variable.

Turning now to FIG. 1, an example embodiment of vehicle cooling system 100 in a motor vehicle 102 is illustrated schematically. Vehicle 102 has drive wheels 105, a passenger compartment 104, and an under-hood compartment 103. Under-hood compartment 103 may house various components under the hood (not shown) of motor vehicle 102. For example, under-hood compartment 103 may house internal combustion engine 10. Internal combustion engine 10 has a combustion chamber which may receive intake air via intake passage 46 and may discharge combustion gases via exhaust passage 48. In one example, intake passage 46 may be configured as a ram-air intake wherein the dynamic pressure created by moving vehicle 102 may be used to increase a static air pressure inside the engine's intake manifold. As such, this may allow a greater mass flow of air through the engine, thereby increasing engine power. Engine 10 as illustrated and described herein may be included in a vehicle such as a road automobile, among other types of vehicles. While the example applications of engine 10 will be described with reference to a vehicle, it should be appreciated that various types of engines and vehicle propulsion systems may be used, including passenger cars, trucks, etc.

Under-hood compartment 103 may further include cooling system 100 that circulates coolant through internal combustion engine 10 to absorb waste heat, and distributes the heated coolant to radiator 80 and/or heater core 90 via coolant lines 82 and 84, respectively. In one example, as depicted, cooling system 100 may be coupled to engine 10 and may circulate engine coolant from engine 10 to radiator 80 via engine-driven water pump 86, and back to engine 10 via coolant line 82. Engine-driven water pump 86 may be coupled to the engine via front-end accessory drive (FEAD) 36, and rotated proportionally to engine speed via a belt, chain, etc. Specifically, engine-driven pump 86 may circulate coolant through passages in the engine block, head, etc., to absorb engine heat, which is then transferred via the radiator 80 to ambient air. The heat transferred to the coolant jacket integrated in the liquid cooling engine may be extracted from the coolant again in a heat exchanger which may be arranged in the front end region of the vehicle. Further, the heat released from combustion of the fuel may be transmitted not only to the walls delimiting the combustion chamber, the exhaust gas flow and where applicable the engine coolant, but also to the engine oil. Therefore, further coolers can be provided, for example, for cooling the transmission oil on automatic transmissions and/or for cooling hydraulic fluids, in particular hydraulic oil which is used for hydraulically activated adjustment devices or for steering assistance. However, due to heat conduction and natural convection, the heat dissipation via the oil pan is often insufficient to observe the maximum permitted oil temperature, so an additional oil cooler is usually provided. In one example, where pump 86 is a centrifugal pump, the pressure (and resulting flow) produced by the pump may be proportional to the crankshaft speed, which in the example of FIG. 1, may be directly proportional to the engine speed. The temperature of the coolant may be regulated by a thermostat valve 38, located in the cooling line 82, which may be kept closed until the coolant reaches a threshold temperature.

Coolant may flow through coolant line 82, as described above, and/or through coolant line 84 to heater core 90 where the heat may be transferred to passenger compartment 104, and the coolant may flow back to engine 10. In some examples, engine-driven pump 86 may operate to circulate the coolant through both coolant lines 82 and 84. A further heat exchanger may include the air conditioning condenser of an air conditioning system which normally works on the cold evaporation process. In this process, the temperature of the air flow supplied to the passenger compartment is lowered by passing air over an evaporator, wherein the air flow extracts the heat from refrigerant flowing internally through the evaporator.

One or more blowers (not shown) and cooling fans may be included in cooling system 100 to provide airflow assistance and augment a cooling airflow through the under-hood components. For example, cooling fan 92, coupled to radiator 80, may be operated when the vehicle is moving and the engine is running to provide cooling airflow assistance through radiator 80. Cooling fan 92 may draw a cooling airflow into under-hood compartment 103 through an opening in the front-end of vehicle 102, for example, through grill 111. Such a cooling air flow may then be utilized by radiator 80 and other under-hood components (e.g., fuel system components, batteries, etc.) to keep the engine and/or transmission cool. Further, the air flow may be used to reject heat from a vehicle air conditioning system. Further still, the airflow may be used to enhance the performance of a turbocharged/supercharged engine that is equipped with intercoolers that reduce the temperature of the air that goes into the intake manifold/engine.

Cooling fan 92 may be coupled to, and driven by, engine 10, via alternator 72 and system battery 74. Cooling fan 92 may also be mechanically coupled to engine 10 via an optional clutch 76. During engine operation, the engine generated torque may be transmitted to alternator 72 along a drive shaft (not shown). The generated torque may be used by alternator 72 to generate electrical power, which may be stored in an electrical energy storage device, such as system battery 74. Battery 74 may then be used to operate an electric cooling fan motor 94. Thus, operating the cooling fan may include, mechanically powering cooling fan rotation from engine rotational output via clutch 76, for example, during engine operation. Additionally or optionally, operating the cooling fan may include, electrically powering cooling fan rotation from engine rotational input, through the alternator and system battery, for example, when engine speed is below a threshold (for example, when the engine is in idle-stop). In another example, the cooling fan may be an electric fan, and operating the cooling fan may include enabling an electric motor coupled to the cooling fan.

An engine controller may adjust the operation of cooling fan 92 based on vehicle cooling demands, vehicle operating conditions, and in coordination with engine operation. In one example, during a first vehicle moving condition, when the engine is operating, and vehicle cooling and airflow assistance from the fan is desired, cooling fan 92 may be operated mechanically (powered by the engine, through the clutch) or electrically (powered by enabling battery-driven electric motor 94), to provide airflow assistance in cooling under-hood components. The first vehicle moving condition may include, for example, when an engine temperature is above a threshold. In another example, during a second vehicle moving condition, when airflow assistance is not desired (for example, due to sufficient vehicle motion-generated airflow through the under-hood compartment), fan operation may be discontinued by disabling the fan motor or uncoupling the fan from the engine. The second vehicle moving condition may further include the engine being deactivated (for example, the engine may be in idle-stop). However, the fan may continue to free-wheel due to the natural flow of ambient air through the fan blades and the influence of the ram air pressure impacting the fan blade surface. The reaction torque of the free-wheeling fan blades may result in a reduced pressure drop across the fan. The reduced pressure drop may reduce cooling system resistance, increase a cooling airflow through the fan, and consequently generate a cooling drag. The resultant increase in aerodynamic drag may reduce the fuel economy of vehicle 102.

The various components described above with reference to FIG. 1 may be controlled by a control system, which includes a controller 12 with computer readable instructions for carrying out routines and subroutines for regulating vehicle systems, a plurality of sensors 16, and a plurality of actuators 18.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 42, 44, and 46. Intake air passage 46 may communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 42 and 44, and an exhaust turbine 176 arranged along exhaust passage 48. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle valve 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174. For a charged internal combustion engine, a charge cooler is often arranged in an intake manifold which lowers the temperature of the aspirated charge air or fresh air and thereby increases the density of the fresh cylinder charge. In this way the charge air cooler contributes to increased filling of the combustion chamber with charge air.

Exhaust passage 48 may receive exhaust gases from other cylinders of engine 10 in addition to cylinder 14. Exhaust gas sensor 128 is shown coupled to exhaust passage 48 upstream of emission control device 178. Gas sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. A cam timing may be adjusted (by advancing or retarding the VCT system) to adjust an engine dilution in coordination with an EGR flow and/or a direct injection of a knock control fluid, thereby reducing EGR transients and improving engine performance.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock control fluid thereto. In some embodiments, the knock control fluid may be a fuel, wherein the injector is also referred to as a fuel injector. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while in one embodiment, the engine may be operated by injecting the variable fuel or knock control fluid blend via a single direct injector; in alternate embodiments, the engine may be operated by using two injectors (a direct injector 166 and a port injector) and varying a relative amount of injection from each injector.

Fuel may be delivered by the injector to the cylinder during a single cycle of the cylinder. Further, the distribution and/or relative amount of fuel or knock control fluid delivered from the injector may vary with operating conditions, such as air-charge temperature, as described herein below. Furthermore, for a single combustion event, multiple injections of the delivered fuel may be performed per cycle. The multiple injections may be performed during the compression stroke, intake stroke, or any appropriate combination thereof.

As described above, FIG. 2 shows one cylinder of a multi-cylinder engine. As such each cylinder may similarly include its own set of intake/exhaust valves, fuel injector(s), spark plug, etc.

The engine may further include one or more exhaust gas recirculation passages for recirculating a portion of exhaust gas from the engine exhaust to the engine intake. In the depicted embodiment, exhaust gas may be recirculated from exhaust passage 48 to intake passage 44 via EGR passage 141. The amount of EGR provided to intake passage 44 may be varied by controller 12 via EGR valve 143. Further, an EGR sensor 145 may be arranged within the EGR passage and may provide an indication of one or more pressure, temperature, and concentration of the exhaust gas.

EGR is regarded as a way of supporting compliance with future limiting values for pollutants, in particular the limiting values for nitrous oxide emissions, as the formation of nitrous oxides requires high temperatures and EGR is a means for reducing such temperatures. Therefore, nitrous oxide emissions can be lowered significantly by increasing the EGR rate. The EGR rate $x_{EGR}$ here is determined as $x_{EGR} = m_{EGR}/(m_{EGR} + M_{Fresh\ air})$ where $m_{EGR}$ is the mass of recirculated exhaust gas and $M_{Fresh\ air}$ the fresh air supplied, and where applicable, compressed. When EGR is used, the charge air can contain a mixture of exhaust gas as well as fresh air.

To achieve a significant reduction in nitrous oxide emissions, high EGR rates in the range of $x_{EGR} \approx 50\%$ to 70% may be required. However, to achieve such high recirculation rates, cooling of the exhaust gas to be recirculated via compression of the exhaust gas is required to increase the density of the recirculated exhaust gas. The internal combustion engine may therefore be fitted with an additional cooling device to cool the exhaust gas to be recirculated.

It will be appreciated that while the embodiment of FIG. 2 shows low pressure (LP-EGR) being provided via an LP-EGR passage coupled between the engine intake upstream of the turbocharger compressor and the engine exhaust downstream of the turbine, in alternate embodiments, the engine may be configured to also provide high pressure EGR (HP-EGR) via an HP-EGR passage coupled between the engine intake downstream of the compressor and the engine exhaust upstream of the turbine. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. When distinct HP-EGR and LP-EGR passages are included, the respective EGR flows may be controlled via adjustments to respective EGR valves.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed. In this way, the system of FIG. 2 enables a method of operating an engine wherein a desired thermal balance is provided without reducing its power output.

In FIG. 3 a flow diagram of a first embodiment of the method for influencing the thermal balance of an internal combustion engine for the purpose of reducing the thermal load is shown. According to the method variant in FIG. 3, the charge air temperature $T_{Charge}$, the coolant temperature $T_{Coolant}$, and the ratio value $\eta_{ignition,act}/\eta_{ignition,opt}$ are determined, where applicable, and used as input values for reading the air ratio $\lambda$ from a map stored in the engine control unit.

In FIG. 3, control system 12 includes engine control unit 300. Within this system is an air ratio unit 302, which, in one embodiment, is a memory unit that stores a map of air ratio values as a function of the input variables $T_{Charge}$, $T_{Coolant}$ and $\eta_{ignition,act}$. For example, control system 12 may be calibrated to receive feedback from temperature sensors, e.g. sensor 116, within the engine system that it uses to look-up air ratio values stored in the memory unit. Then, based on values stored in the table, control system 12 may increase the amount of fuel injected in order to further adjust the air-to-fuel ratio and thereby reduce the thermal load on engine system 10. In another embodiment, air ratio unit 302 may be a processor capable of computing optimal air ratio values as a function of each input variable individually, or in various combinations. For example, in some instances control system 12 may be programmed to reduce an air ratio in response to a coolant temperature above a threshold, while in other instances, control system 12 may be programmed to reduce an air ratio in response to a high coolant temperature in the coolant system and a high air temperature in the air intake passage. In still other instances, the air ratio may be reduced in response to all three input variables, as described in detail below.

Methods are advantageous in which the air ratio $\lambda$ is reduced by increasing the fuel quantity injected. For example, on direct injection, the injectors of the cylinders are controlled to inject the fuel individually via control lines by means of the engine management system, wherein the fuel quantity injected serves to set the air ratio $\lambda$. In other embodiments, methods are advantageous in which the air ratio $\lambda$ is reduced by setting the air ratio $\lambda$ via the charge air quantity provided. For example, the air ratio $\lambda$ may be set via the charge air quantity provided by setting a throttle valve, e.g. throttle valve 164, arranged in the intake line, e.g. intake line 46. However, in some instances, reducing the charge air quantity provided may also lead to variation of the power and power delivery.

In other embodiments, enrichment is used when the air ratio is reduced starting from a super-stoichiometric operation of the engine. Therefore, embodiments of the method are advantageous in which the air ratio $\lambda$ of the internal combustion engine is reduced starting from super-stoichiometric operation with $\lambda$ greater than 1 or stoichiometric operation with $\lambda$ substantially equal to 1, whereby the engine is transferred into a sub-stoichiometric operation with $\lambda$ less than 1.

The first input parameter used by control unit 300 to influence the thermal balance of an internal combustion engine is the charge air temperature 304, or $T_{Charge}$. According to method 400 described in detail below, the air ratio may be reduced by a first amount responsive to charge air over-temperature, or more simply as a function of the charge air temperature in order to reduce the thermal load of the internal combustion engine. For instance, the air ratio may be reduced, and the fuel-air mixture enriched, in response to a charge air temperature that exceeds a threshold value, which is referred to as the charge air over-temperature.

In particular, the method allows for the reduction of heat input, and thereby a reduction in the thermal load, even in demanding driving situations. At the same time, the driving speed or charge pressure and hence the power can be maintained. For example, acceleration, hill climbing, and towing a trailer are characterized by high loads and low vehicle speeds which cause problems in regard to adequate heat dissipation.

Tests have shown that the heat input into an engine can be reduced without reducing engine power. Based on such tests, the method offers advantages since a lower fuel consumption (e.g. in grams per minute) may occur compared to conventional derating methods that reduce the charge pressure to lower the heat input. Although somewhat unexpected, as derating methods lower the heat input by reducing the power, which is a fuel-saving measure, on enrichment, more fuel is injected than can be burned for the air quantity provided, which results in excess fuel being heated and evaporated so the temperature of the combustion gas falls. However, this procedure is generally regarded as disadvantageous with regard to pollutant emissions and fuel consumption, but may still be acceptable in some circumstances. The method is consequently characterized in that the thermal load of the internal combustion engine is reduced without substantially reducing power delivery. In some embodiments, fuel consumption can be reduced but in other embodiments, a reduction of the air ratio for the purpose of enrichment may result in increased fuel consumption.

According to the method, the thermal balance of an internal combustion engine may be influenced to limit and/or reduce the thermal load of the internal combustion engine in a manner that does not substantially reduce the power provided by the engine. However, in some embodiments, the power may be reduced but the reduction may still be less than the known derating methods.

In this method, the enrichment may be indicated by the charge air temperature $T_{Charge}$ wherein enrichment can also take place for other reasons such as, for example, to lower the exhaust temperature in order to protect an exhaust post-treatment system from overheating.

In some instances, the method may be performed briefly so to include a slight enrichment (e.g. with $\lambda<1$) for a short period of time. For example, the enrichment may be as low as possible to avoid a metrological malfunction of a lambda sensor in order to ensure that the exhaust gas post-treatment systems functions properly. Further, this may avoid the disadvantages associated with enrichment, which may manifest more strongly as enrichment increases. In addition, the extent of enrichment may be such that the heat input into the engine is reduced.

In some embodiments, petrol engines frequently include a three-way catalytic converter that operates in a narrow range with respect to stoichiometric operation ($\lambda \approx 1$) in order to reduce the nitrous oxides (e.g. NOx) by means of the non-oxidized exhaust gas components present, namely the carbon monoxides and unburned hydrocarbons, and at the same time oxidize these exhaust gas components. Therefore, embodiments of the method are advantageous in which the internal combustion engine is transferred into a sub-stoichiometric operation with $0.97>\lambda>0.83$. In particular embodiments of the method are advantageous in which the internal combustion engine is transferred into a sub-stoichiometric operation with $0.95>\lambda>0.85$, and in some instances, preferably $0.92>\lambda>0.88$.

With regards to the charge air temperature, $T_{Charge}$, embodiments of the method are advantageous in which $T_{Charge}$ is the temperature of the aspirated fresh air, $T_{Air}$, wherein the aspirated fresh air is used as a measure of $T_{Charge}$. This is the case, for example, in an aspirated engine without exhaust gas recirculation, or in an internal combustion engine with exhaust gas recirculation when the temperature of the charge air is determined upstream of the introduction of the exhaust gas into the intake line.

In other embodiments where internal combustion engines contain exhaust gas recirculation comprised of a return line that branches from an exhaust line and opens into the an intake line, $T_{Charge}$ may be the temperature of the fresh air mixed with the recirculated exhaust gas, wherein the temperature of the mixture of recirculated exhaust gas and fresh air is used as $T_{Charge}$.

In still other embodiments where internal combustion engines contain at least one exhaust gas turbocharger comprised of a turbine arranged in an exhaust line and a compressor arranged in an intake line, $T_{Charge}$ may be the temperature of the compressed charge air downstream of the compressor, wherein the temperature of the compressed charge air downstream of the compressor is used as $T_{Charge}$. Nonetheless, even with a charged internal combustion engine, a temperature upstream of the compressor may also be used as $T_{Charge}$.

In still further embodiments, a charge air cooler may be provided downstream of the compressor in which it is advantageous that $T_{Charge}$ is the temperature of the compressed cooled charge air downstream of the charge air cooler, although, in principle, a temperature upstream of the charge air cooler can also be used. The statements made in connection with exhaust gas recirculation also apply to charged internal combustion engines.

For liquid-cooled internal combustion engines, the method may also include a second input parameter identified as the coolant temperature at 306, or simply $T_{Coolant}$. $T_{Coolant}$ can also be used by control unit 300 to influence the thermal balance of example engine system 10. According to the method, the air ratio $\lambda$ may be reduced by a second, different amount, responsive to coolant over-temperature, or more simply as a function of $T_{Coolant}$ in order to reduce the thermal load on the engine. For instance, the air ratio $\lambda$ may be reduced, and the fuel-air mixture enriched, in response to a coolant temperature that exceeds a threshold value. The introduction of an additional operating parameter as a decision criterion for reducing the air ratio $\lambda$ increases the quality of the method for influencing the thermal balance of an engine.

According to the method, the decision on whether enrichment occurs is made on the basis of the momentary operating state of the liquid cooling system. This avoids the liquid cooling system being operated above its performance limit wherein less heat is extracted from the engine than is optimal. At a discrete operating point of the internal combustion engine, the liquid cooling may reach its maximum cooling performance such that $T_{coolant}$ serves as an indicator, with temperatures above this point referred to the engine coolant over-temperature. Then, in response to the liquid cooling system reaching its maximum allowable performance, enrichment is performed in order to limit or reduce the thermal load of the internal combustion engine. In such cases, according to the method, a substantial reduction of power can also be avoided.

Overloading of the liquid cooling system may be associated with overheating and excessive evaporation of coolant. However, because the coolant is present in vapor form in some regions, a reduced heat dissipation may occur which can lead to material melting. Furthermore, damage resulting from cavitation may occur. With the method described herein, advantages are offered since excessive evaporation of coolant and damage due to cavitation may be prevented.

In some embodiments, the air ratio $\lambda$ can be read from a map stored in the engine control unit, using $T_{Charge}$ and/or $T_{Coolant}$ as input values. Furthermore, if the liquid-cooled internal combustion engine has a heat exchanger, method variants are advantageous in which the $T_{Coolant}$ is a temperature of the coolant downstream of the cylinder head and upstream of the heat exchanger because the coolant may have a maximum temperature in this portion of the coolant circuit.

In other embodiments, the method is advantageous in which the air ratio $\lambda$ is reduced when $T_{Charge}$ exceeds a predefinable temperature threshold, $T_{Charge,up}$ and/or $T_{Coolant}$ exceeds a predefinable temperature threshold, $T_{Coolant,up}$, wherein either input variable may also exceed a temperature threshold for a time period greater than a predefinable time interval, $\Delta t_{Charge,up}$, $\Delta t_{Coolant,up}$. The introduction of an additional condition for reducing the air ratio prevents over-frequent or hasty changing of engine operating conditions, in particular for transitions to or from rich or sub-stoichiometric operation of the engine when $T_{Charge}$ or $T_{Coolant}$ briefly exceeds a predefinable temperature and then falls again or fluctuates about the predefined temperature. In this context, it may be advantageous to perform an enrichment only when necessary to protect the engine from overheating.

In still other embodiments, advantages in which the air ratio $\lambda$ of the internal combustion engine is increased again starting from a sub-stoichiometric operation (e.g. $\lambda<1$) when $T_{Charge}$ falls below a predefinable lower temperature threshold, $T_{Charge,down}$, and/or $T_{Coolant}$ falls below a predefinable lower temperature threshold, $T_{Coolant,down}$. This is because enrichment also entails disadvantages. For example, excess fuel discharged from the cylinders of the engine may go unburned, so on rich operation in particular the concentration of unburned hydrocarbons in the exhaust gas is significantly higher. Because of this, the method includes performing an enrichment only when necessary to protect the engine from overheating. For similar reasons, rich operation is maintained only when such operation is unavoidable. It is therefore advantageous to increase the air ratio $\lambda$ according to the method variant discussed as soon as permitted.

In still further embodiments, the method may be advantageous in which $T_{Charge}$ and/or $T_{Coolant}$ are determined by calculation. For example, $T_{Charge}$ or $T_{Coolant}$ within an engine system may be determined by calculation or simulation using known models, e.g. dynamic heat and kinetic models. This may be done to determine the reaction heat generated during combustion. As input signals for the simulation, other operating parameters within the engine may be used which are already present and determined in another context. The advantage of performing a simulation calculation is that no further components, in particular no sensors, are necessary to determine a temperature within the engine system, which is beneficial in relation to cost. The disadvantage, however, is that a temperature determined in this manner may represent an estimated value, which may reduce the quality of the control or regulation of the air ratio.

In another embodiment of the method, it is advantageous in which $T_{Charge}$ and/or $T_{Coolant}$ are determined metrologically by means of one or more sensors. Metrological determination of the charge air temperature or coolant temperature offers few difficulties. This is because the charge air and coolant have comparatively moderate temperatures even when the internal combustion engine is running warm. In addition, there are a multiplicity of possibilities, or different places for arranging a sensor in the charge air flow or coolant flow without experiencing a disadvantageous effect on the functional suitability of the engine.

Turning now to the third input parameter, the ratio value $\eta_{ignition,act}/\eta_{ignition,opt}$ can be used by control unit 300 to influence the thermal balance of an internal combustion engine. Therefore, according to the method, and in a similar manner as described above with respect to $T_{Charge}$ or $T_{Coolant}$, the air ratio may be reduced as a function of the ratio value $\eta_{ignition,act}/\eta_{ignition,opt}$ in order to reduce the thermal load of the internal combustion engine. For instance, the air ratio λ may be reduced, and the fuel-air mixture enriched, in response to a ratio value $\eta_{ignition,act}/\eta_{ignition,opt}$ that falls below a predefinable value x.

With respect to the variables comprising the ratio value, efficiency parameter 308, or $\eta_{ignition,act}$, designates the efficiency of the engine system in a momentary operating point or operating state of the engine. A momentary ignition timing point $t_{ignition,act}$ may be advanced by the engine control system in a way that relates to an ignition timing point optimized for fuel consumption and emissions in order to prevent knocking of the engine under high thermal load. To this extent, the associated efficiency $\eta_{ignition,act}$ deviates from an optimal efficiency, $\eta_{ignition,opt}$ shown at 310, which may also be stored into memory and coupled to air ratio unit 302, in which an optimized ignition timing point may be used to indicate that the engine is working less efficiently than desired (e.g. $\eta_{ignition,act}/\eta_{ignition,opt} \leq 1$). In this case, enrichment may be necessary to limit the thermal load as soon as the momentary efficiency $\eta_{ignition,act}$ deviates from the optimized efficiency $\eta_{ignition,opt}$ by more than a predefinable extent.

For internal combustion engines fitted with an engine control system, embodiments of the method are advantageous in which an engine control unit comprises a map wherein the stored air ratio λ can be read using the charge air temperature $T_{Charge}$, the coolant temperature $T_{Coolant}$ and/or the ratio $\eta_{ignition,act}/\eta_{ignition,opt}$ as input values. The various components described above with reference to control unit 300 may be controlled by a control system, which includes a controller 12 with computer readable instructions for carrying out routines and subroutines for regulating vehicle systems, a plurality of sensors 16, and a plurality of actuators 18.

In FIG. 4, a flow chart illustrating example method 400 capable of influencing the thermal balance of an engine without substantially reducing its power output is shown. In particular, the method allows for the reduction of heat input by adjusting the air-fuel mixture as a function of engine speed and load. Advantages of the method include maintaining the vehicle drive speed or charge pressure and hence the power even in demanding driving situations.

At 402, method 400 includes determining one or more of the input variables. As described above with respect to FIG. 3, the input variables may be determined either directly or indirectly from sensors within the engine system. For example, $T_{Charge}$ may be measured by one or more temperature sensors located in the intake passage. Alternatively, $T_{Charge}$ may be inferred based on engine operating conditions such as speed, load, spark retard, etc., or estimated by any combination of temperature estimation methods as described herein. In some embodiments, it is advantageous to determine all three input variables which provides maximum flexibility while ensuring that enrichment only occurs when necessary to protect the engine from overheating.

At 404, method 400 includes comparing at least one input variable to a reference threshold to determine whether the thermal load on the engine is too high. Then, if one or more of the input variables exceeds or falls below a threshold, control system 12 may process the information and make adjustments within the engine system to reduce the thermal load and prevent overheating of the engine. For example, if $T_{Charge}$ or $T_{Coolant}$ are above the temperature thresholds, $T_{Charge,up}$ or $T_{Coolant,up}$, respectively, or if the ratio value $\eta_{ignition,act}/\eta_{ignition,opt}$ falls below a threshold x then control system 12 may direct fuel injector 166 to increase the amount of fuel injected into the cylinder and lower an air ratio λ in order to reduce the heat input to the engine to limit the thermal load.

If a comparison of one or more input variables to a reference threshold indicates that the input parameter falls within a predefined range, then at 406, method 400 includes continuing to operate the engine system with the current settings. When this is the case, feedback from sensors in the system do not indicate an overheating engine so no adjustments are made.

Conversely, if an input variable exceeds a limit, either because it is low compared to a threshold, e.g. $\eta_{ignition,act}/\eta_{ignition,opt}$ is below x, or because it is high compared to a threshold, e.g. $T_{Charge}$ or $T_{Coolant}$ is greater than $T_{Charge,up}$ or $T_{Coolant,up}$, respectively, then method 400 may proceed to 408 where control system 12 further determines whether each input variable has exceeded or fallen below its reference threshold for a time period greater than a time threshold. Therefore, the control system may further store at least one time threshold that it uses to determine how long each variable has operated outside of a predefined range. As described already with respect to FIG. 3, in some embodiments, methods are advantageous in which the air ratio λ is reduced when the charge air temperature $T_{Charge}$ exceeds a predefinable upper limit temperature, $T_{Charge,up}$ and/or the coolant temperature $T_{Coolant}$ exceeds a predefinable upper limit temperature $T_{Coolant,up}$, wherein each input variable exceeds an upper temperature limit for a time period greater than a predefinable time interval, $\Delta t_{Charge,up}$, $\Delta t_{Coolant,up}$. The introduction of an additional condition for reducing the air ratio λ prevents over-frequent or hasty changing of engine operating conditions, in particular for transitions to or from rich or sub-stoichiometric operation of the engine when $T_{Charge}$ or $T_{Coolant}$ briefly exceeds a predefinable temperature and then falls again or fluctuates about a predefined temperature. In this context, it may be advantageous to perform an enrichment only when necessary to protect the engine from overheating.

If at least one of the input variables exceeds or falls below a threshold in the manner just described, then control system 12 may be programmed to process the feedback and determine an optimal air ratio at which the engine is operated to reduce the thermal load without reducing its power. Therefore, at 410, method 400 includes determining an air ratio λ in response to one or more of the input variables. In one embodiment, air ratio values are a map stored into memory as a function of each input parameter. For instance, air ratio unit 302 shown in FIG. 3 may be further comprised of data tables for each variable that indicate λ values where the engine is to operate to reduce the thermal load of the engine and thereby prevent overheating. In this manner, each data table may contain a calibrated set of λ values as a function of the input variable that can be used to adjust the air-fuel mixture of the engine. Although in some embodiments, it may be sufficient to implement coolant and air charge temperature derating or spark efficiency derate, respectively, in other embodiments, implementation of all three input variables may provide maximum flexibility. For this reason, using engine speed, load and gear as map-parameters ensures that enrichment does not occur in unnecessary operating conditions For embodiments involving a controller making decisions based on feedback from at least two input variables, the control system may be further programmed to determine an optimal air ratio from different air ratio values indicated. For instance, if all three engine parameters are collected and indicate the thermal load on the engine is too high, then because air ratio unit 302 stores λ values as a function of each variable, the controller may look-up an air ratio value for each parameter. Then, based on the λ values accessed, the controller may be programmed to select an optimal λ value or comprise a means of determining a λ value at which to adjust settings within the engine system. In the latter case, when determining a λ value to set the engine, a controller may simply average the data or also be programmed to use more sophisticated simulation techniques based on dynamic heat and kinetic models.

An example is provided to demonstrate the flexibility of the method when at least two input variables are used by a controller. Consider the embodiment having a controller that receives feedback from all three input parameters and that, in turn, looks-up λ values stored separately as a function of each parameter (e.g. map of the thermal load of the engine). For instance, controller 12 may receive a signal from temperature sensor 116 coupled to cooling sleeve 118 as an indication of $T_{Coolant}$, a temperature sensor within the intake manifold (not shown) as an indication of $T_{Charge}$, and a signal from ignition system 190 to indicate spark efficiency, or $\eta_{ignition,act}/\eta_{ignition,opt}$. Furthermore, based on each parameter relative to a reference threshold, the controller may simply look-up a stored value for each parameter that indicates an air-fuel ratio at which to operate the engine. As such, it is possible for the controller to look-up and make a decision based on three different λ values. For instance, in one scenario, a controller may process the engine speed and load information along with $T_{Charge}>T_{Charge,up}$, $T_{Coolant}>T_{Coolant,up}$, and $\eta_{ignition,act}/\eta_{ignition,opt}<x$ that all provide indications of an overheating engine, but to different extents. As such, because λ values are stored as a function of each input parameter, the λ values accessed may vary based on the conditions. For example, suppose for simplicity that the λ values indicated by $T_{Charge}$, $T_{Coolant}$, and $\eta_{ignition,act}/\eta_{ignition,opt}$ are 0.75, 0.85 and 0.95, respectively, under a first set of conditions. Alternatively, the λ values could also be 0.95, 0.85 and 0.75, respectively under a second set of conditions or 0.85, 0.95 and 0.75, respectively, under a third set of conditions and so on, where the various sets of conditions are different. Alternatively, different numeric values are also possible, or in some instances, all three values may be substantially identical. Therefore, controller 12 may further comprise a means of determining a single λ value at which to set the engine based on different λ values. For example, in one embodiment, controller 12 may opt for the lowest λ value to ensure that the amount of fuel injected is enough to reduce the thermal load of the engine and prevent overheating even if a slight reduction in power results. In other embodiments, controller 12 may select the λ value that reduces the thermal load just enough to prevent overheating without substantially reducing the power output of the engine. In still other embodiments, controller 12 may be programmed to process the data, for instance, by averaging the data in order to arrive at a λ value that optimizes the air-fuel mixture and power output based on engine speed and load. Once is determined, the method further includes adjusting settings within the engine system to reduce the air ratio λ.

If method 400 determines a reduction in air flow ratio to a specific λ value is to occur, then at 412, the method includes reducing the air flow ratio λ in order to reduce the thermal load on the engine. This may include making adjustments within the engine system to reduce the air ratio. For example, control system 12 may direct fuel injectors 166 to increase the amount of fuel injected to reduce the thermal load or alternatively adjust throttle valve 164 in intake passage 46 to decrease the amount of air supplied to a combustion chamber of the engine block. After adjusting settings within the engine system, control system 12 may further monitor the engine system and input variable parameters as it continues to manage the thermal load of the engine.

The methods described herein, are not meant to be limited or restricted to the engine system described but can also be applied to internal combustion engines without exhaust gas recirculation and/or a liquid cooling system. The subject matter of the present disclosure includes all novel and non-obvious combinations and sub-combinations of the various systems and configurations, and other features, functions, and/or properties disclosed herein.

The invention claimed is:

1. A method for influencing a thermal balance of an engine, comprising:
   determining a charge air temperature supplied to a cylinder,
   adjusting an air-fuel ratio in response to the charge air temperature,
   reducing the air-fuel ratio if the charge air temperature exceeds an upper threshold temperature, and
   reducing the air-fuel ratio based on a spark efficiency.

2. The method of claim 1, wherein the air-fuel ratio is reduced by increasing a fuel quantity injected.

3. The method of claim 2, wherein the air-fuel ratio is reduced from a stoichiometric operation where the air-fuel ratio is substantially equal to 1 to a sub-stoichiometric operation where the air-fuel ratio is less than 1.

4. The method of claim 1, wherein the charge air temperature is a temperature of aspirated fresh air.

5. The method of claim 1, wherein the charge air temperature is a temperature of fresh air mixed with recirculated exhaust gas from a return line that branches from an exhaust line and opens into an intake line.

6. The method of claim 1, wherein the charge air temperature is a temperature of compressed charge air downstream of a compressor from an exhaust gas turbocharger that comprises a turbine arranged in an exhaust line and the compressor arranged in an intake line.

7. The method of claim 6, wherein a charge air cooler is provided downstream of the compressor, and wherein
the charge air temperature is a temperature of a compressed cooled charge air downstream of the charge air cooler.

8. The method of claim 1, wherein the engine is liquid-cooled and includes a coolant jacket integrated in a cylinder head, and wherein the coolant jacket is part of a coolant circuit, the method further including:
determining a coolant temperature,
adjusting the air-fuel ratio in response to the coolant temperature, and
reducing the air-fuel ratio if the coolant temperature exceeds an upper threshold.

9. The method of claim 8, wherein the liquid-cooled engine contains a heat exchanger, and wherein
the coolant temperature is a temperature of coolant downstream of the cylinder head and upstream of the heat exchanger.

10. The method of claim 8, wherein the air-fuel ratio is reduced when at least one of:
the charge air temperature exceeds the upper threshold temperature for a first threshold time period, and
the coolant temperature exceeds the upper threshold temperature for a second threshold time period.

11. The method of claim 10, wherein at least one of the charge air temperature and the coolant temperature is determined by calculation.

12. The method of claim 10, wherein at least one of the charge air temperature and the coolant temperature is determined by a sensor.

13. The method of claim 1, wherein
the spark efficiency is a ratio relating an efficiency at an ignition timing point to an efficiency at an optimized ignition timing point, and wherein
the air-fuel ratio is reduced when the ratio falls below a threshold.

14. The method of claim 1, wherein the engine is equipped with an engine control system, and wherein the engine control system stores a map to determine the air-fuel ratio using at least one of the charge air temperature, coolant temperature, and the air-fuel ratio as input values.

15. A method, comprising:
reducing an air-fuel ratio in response to a charge air over-temperature and engine coolant over-temperature, where the ratio is reduced by a first amount responsive to charge air over-temperature and by a second, different amount, responsive to coolant over-temperature, and reducing the ratio by a third amount in response to engine efficiency.

16. The method of claim 15, wherein the air-fuel ratio is reduced in response to a spark efficiency below a threshold.

17. The method of claim 16, wherein an amount of air-fuel ratio reduction is based on at least one of:
a degree of charge air over-temperature, a degree of engine coolant over-temperature, and the spark efficiency.

18. The method of claim 15, wherein the first amount is larger than the second amount during first operating conditions, and wherein the first amount is smaller than the second amount during second operating conditions.

19. A method, comprising:
reducing an air-fuel ratio in response to a charge air over-temperature, engine coolant over-temperature, and an engine spark-related efficiency, where the ratio is reduced by a first amount responsive to charge air over-temperature, by a second, different amount, responsive to coolant over-temperature, and by a third, different amount, responsive to an engine efficiency at a first ignition timing relative to an optimized ignition timing.

* * * * *